April 15, 1958 F. T. ROBERTS ET AL 2,830,622
HOSE AND METHOD OF MAKING SAME
Filed Nov. 8, 1956 2 Sheets-Sheet 1

INVENTORS
Fred T. Roberts
Robert E. Roberts
BY
Johnson and Kline
ATTORNEYS

April 15, 1958     F. T. ROBERTS ET AL     2,830,622
HOSE AND METHOD OF MAKING SAME
Filed Nov. 8, 1956     2 Sheets-Sheet 2
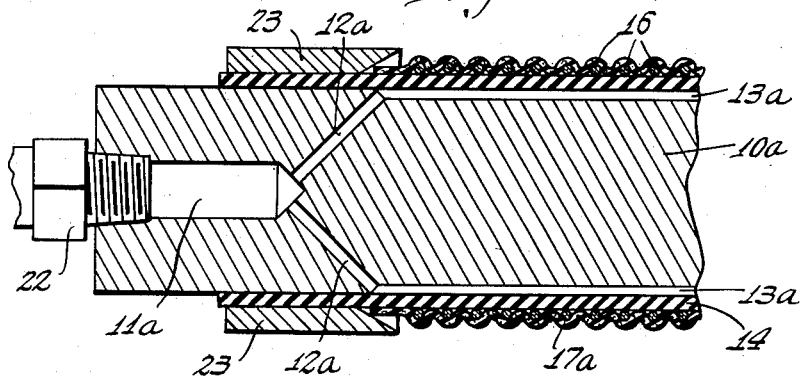
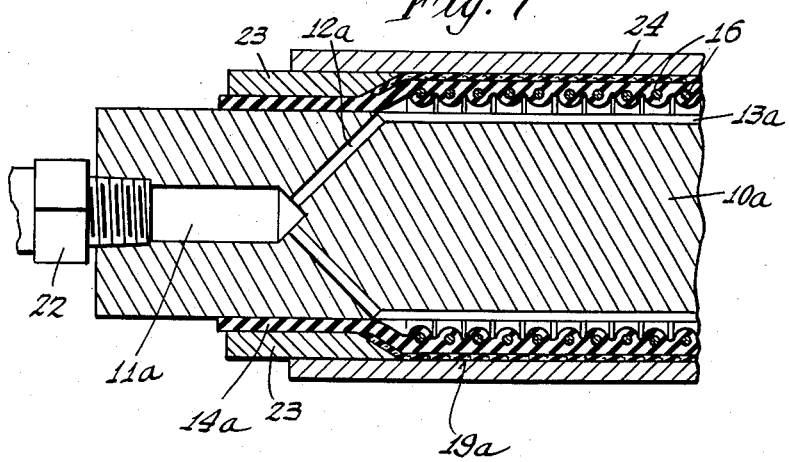
INVENTOR.
Fred T. Roberts
Robert E. Roberts
BY
Johnson and Kline
ATTORNEYS

United States Patent Office 2,830,622
Patented Apr. 15, 1958

2,830,622

HOSE AND METHOD OF MAKING SAME

Fred T. Roberts and Robert E. Roberts, Wilton, Conn.

Application November 8, 1956, Serial No. 621,093

10 Claims. (Cl. 138—56)

The present invention relates to a hose and the method of making the same.

It is an object of the present invention to provide a reenforced, flexible, elongate hose member which is capable of being severed into shorter lengths so that the operator of a gas station or the like can provide various hose sections of different lengths from the elongate hose member without requiring large stocks of various length hose to be kept on hand.

This is accomplished by providing an elongate hose member with a smooth molded outer surface and with a plurality of annular reenforcements disposed therein and molded in the elongate member in predetermined spaced relation so that hose sections of the desired length can be formed by severing the elongate member between the annular reenforcements as required.

A feature of the invention resides in the use of annular reenforcements comprising a single coil of resilient wire, in which the ends of the coil are not secured together and which are embedded in the body of the hose, which is preferably formed of elastomeric material, so that the ends are joined together only by the elastomeric material surrounding them whereby they have limited expansion and contraction as controlled by the elastomeric material.

The hose of the present invention is made by a novel method wherein a body of elastomeric material, preferably in sleeve form, is disposed on a mandrel on which it may be expanded. The reenforcements are then located on the exterior of the body and the mandrel slightly expanded to cause the body to grip the reenforcements and hold them in place. Thereafter, an outer layer is provided over the reenforcements and body and is wound thereon so as to secure the reenforcements in place and to be adhesively secured to the body in the space between the reenforcements. The outer layer can be elastomeric material having wear-resistant properties or other desired properties, or can be of fabric or fabric impregnated with elastomeric material. The assembly is then removed from the inflatable mandrel and inserted into a mold having a cylindrical cavity and the ends of the body attached in an airtight manner to the end portions of the mold and fluid under pressure is applied to the interior of the hose so as to cause the outer layer to be pressed against the cavity of the mold to form a smooth, cylindrical outer surface while the body forming the interior of the hose is pressed into engagement with the reenforcements so as to embed the same therein and also pressed against the body forming the outer portion of the hose so as to provide the corrugated interior with the reenforcements forming spaced corrugations in the hose. The reenforcements are slightly expansible and enable the hose to be readily inserted on fittings and yet effectively hold the hose to the fitting when the usual external clamps are applied.

In some circumstances it may be desirable to use a helical reenforcement for part of the hose, and this is accomplished by providing the helical reenforcement on the body for those sections of the hose which are not to be severed and by including annular reenforcements on those parts of the hose which are to be severed. The method in each case is the same though different mandrels may be used.

Other features and advantages of the invention will be apparent from the specification and claims when considered in connection with the drawings in which:

Fig. 6 shows a hose body built directly on the mandrel.

Fig. 7 shows the mandrel and assembled body in a mold.

Figure 1:
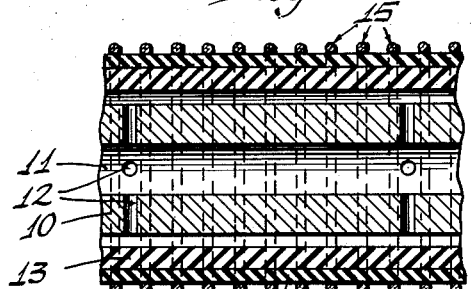
Figure 1 is a fragmentary sectional view through the mandrel with the body expanded into holding relation with the reenforcement means.

In accordance with the present invention an elongate hollow mandrel 10 is provided. This mandrel may be made of any desired length and is provided with a center bore 11 having a plurality of passages 12 extending therefrom to the surface. If desired the mandrel may be provided with a resilient outer jacket 13 extending for the full length thereover. Disposed on the outer jacket is a body 14 of moldable material, preferably elastomeric material (such as rubber—natural or synthetic—or thermoplastic resins which may be molded under heat and pressure, for example, polyethylene, polyamides, vinyl polymers, copolymers and the like, the particular requirement of the hose determining the composition thereof) which is adapted to be set in final form after molding. Setting as used herein means either vulcanizing or cooling of the material to maintain the material in its molded shape.

Figure 4:
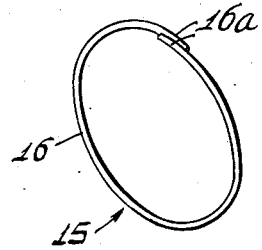
Fig. 4 is a perspective view of an annular reenforcement.

In carrying out the present invention, reenforcing means are spaced at predetermined intervals along the the hose, as shown in Fig. 1. If desired, a carrier as disclosed in our copending application Serial No. 550,307, filed December 1, 1955, now Patent No. 2,780,274 can be employed to hold the reenforcements in predetermined spaced relation as they are inserted over the body 14. Preferably, the reenforcement means comprises annular members 15 formed from a single coil 16 of resilient wire with the ends 16a in unsecured relation. Preferably, the ends are overlapped as shown in Fig. 4. While the reenforcements may be covered with elastomeric material which will adhere to and is compatible with the body material or coated with a bonding agent or adhesive, they are herein illustrated as being bare wire.

Fluid pressure is applied to the bore in the mandrel to cause the body 14 to be expanded slightly outwardly and engage the reenforcing members and hold them in position therealong as shown in Fig. 1. If bare wire is used, the mandrel is then inserted into a lathe or otherwise provided with a wrapping or layer 17 of outer material. While this can be stockinet or bias fabric or tire cord fabric coated or impregnated with an elastomeric material, it is herein illustrated as a layer of elastomeric material.

Figure 2:
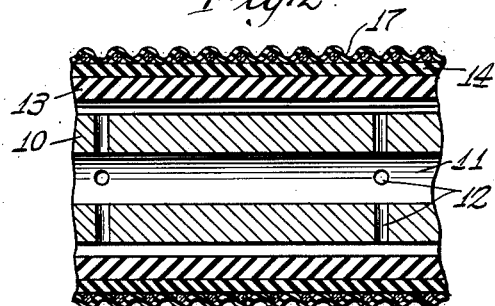
Fig. 2 is a view similar to Fig. 1 showing the outer layer in position.
Figure 3:
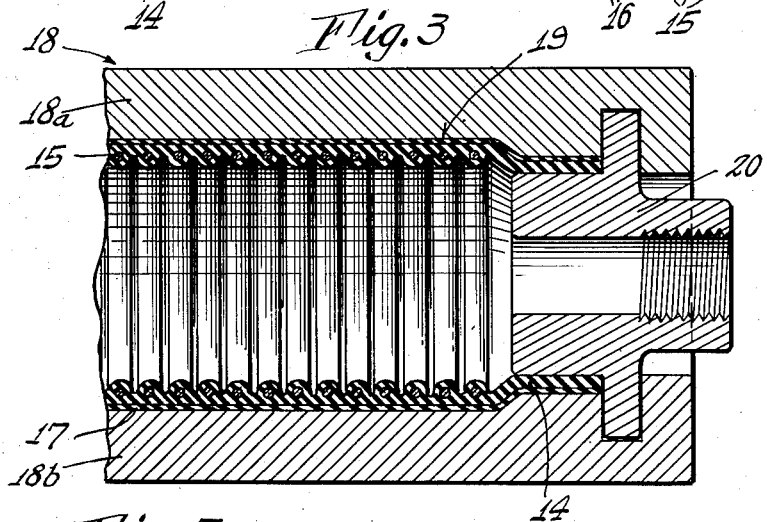
Fig. 3 is a view of the assembly in the mold with the fluid pressure applied thereto to mold the hose body.

It will be seen in Fig. 2 that the outer layer is preferably wound on and overlies the reenforcements and is pressed into engagement with the inner layer between the reenforcements to hold them in place with the reenforcements projecting from the outer surface. The assembled body is then inserted in a mold 18 having a cylindrical molding cavity 19. In the form of the invention shown in Fig. 3, the mold is a longitudinally split mold having mold sections 18a, 18b. When the assembled body is formed on an expansible jacket on the mandrel as shown in Figs. 1 and 2, it is removed from the mandrel and an end plug 20 inserted in the end of the body as shown in Fig. 3, whereby the hose can be inflated from a suitable source (not shown). This causes the body material to be forced outwardly so that the outer layer is pressed against the walls of the cylindrical cavity and the inner layer is forced around the reenforcements which do not expand as much as the body material so that they are embedded therein and also against the outer layer as shown in Fig. 3. This provides a flexible, reenforced hose with a smooth, molded outer surface and a corrugated inner surface having the corrugations formed by the reenforcements. When the reenforcements are embedded in the body of the hose, as shown in Fig. 3, the ends are not directly connected but are secured together by means of the elastomeric material surrounding them and adhered thereto. This provides for a limited expansion and contraction of the hose as determined by the extent of yield in the elastomeric material. It will be seen, therefore, that a very strong, yet flexible divisible hose having a smooth, molded outer surface is provided.

With a hose thus constructed of long lengths, for example six feet or more, it is possible for the mechanic to sever from the elongate hose, by cutting between the annular reenforcements, a piece of hose of the desired length and thus will enable him to meet the varying distances found in various automobiles between, for example, the radiator and the engine block without having to maintain a large stock of various lengths on hand.

Figure 5:
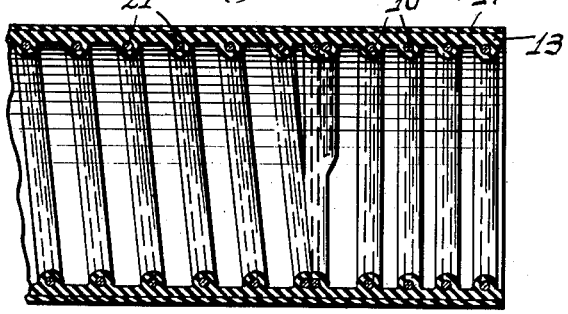
Fig. 5 is a fragmentary view of the hose showing the combined spiral and annular reenforcements therein.

Under some circumstances it may be desired to provide the elongate hose with predetermined portions having helical wire reenforcements therein and connected to portions having annular reenforcements therein. A section of such a hose is shown in Fig. 5 wherein the helical reenforcement 21 is positioned adjacent a plurality of annular reenforcements so that by severing the hose between the annular reenforcements limited variations in the hose length can be obtained. The combined hose can be made by the same method as the annular reenforced hose.

In the form of the invention shown in Figs. 6 and 7, the hose body is formed directly on a mandrel 10a. The mandrel has a center bore 11a and outwardly extending passages 12a from the bore to one or more grooves 13a in the surface thereof for the purpose of expanding the assembled body thereon during the forming and molding operation as required.

The mandrel which may be of any desired length is adapted to be connected to a source of fluid pressure by a connector 22 communicating with the bore 11a. A layer or sleeve of body material 14 is disposed directly on the outer surface of the mandrel as shown in Fig. 6. Suitable clamps 23 are applied to the end of the body material to clamp it in airtight relation to the end portions of the mandrel.

The spaced reenforcing rings 16, such as shown in Fig. 4, are positioned on the outer surface of the sleeve and project outwardly therefrom as shown in Fig. 6.

The mandrel supplies a slight fluid pressure to the interior of the body which expands the body material outwardly into holding engagement with the rings to properly locate them and maintain them in position on the outer surface. Under some circumstances the assembly can then be inserted in a mold cavity and the body material forced outwardly by internal pressure so as to extend around the reenforcements and into engagement with the walls of the mold to form the smooth surface for the hose with the reenforcements projecting from the interior of the hose. It is preferred, however, to provide a cover layer 17a over the body and reenforcements. As herein illustrated this cover layer 17a is formed from a tire cord material having a skin of elastomeric material thereon. The material is severed between the cords and is wrapped around the body and reenforcements thereon in one or more layers or plies, preferably with the cords extending longitudinally of the body. The layer may or may not, as required, be rolled down into engagement with the reenforcements and the body as shown in Fig. 6. Thereafter, the assembled body and mandrel are inserted in a mold, which is herein illustrated as a cylindrical tube 24 having its smooth inner bore 19a of a diameter conforming to the outer diameter of the hose and being preferably slightly larger than the clamps so that the mandrel can be readily inserted in place and positioned thereby as shown in Fig. 7 and yet the body material will not be forced thereover when pressure is built up within the hose so as to cause the body layer to be pushed outwardly and cause the outer layer to be pressed against the wall of the mold to form a smooth, cylindrical outer surface. This movement of the body material will cause the reenforcements to project from the inner surface of the hose as is clear in Fig. 7.

While the pressure is maintained on the hose, it is then subjected to heat or such other treatment as will set it in its molded form. The internal fluid pressure is released and the mandrel and molded hose are removed from the mold. The clamps are released and the molded hose is removed from the mandrel. The end portions 14a which are disposed under the clamps and are of a diameter less than that of the hose may be removed if desired.

It is to be understood that the cylindrical tube or the two-part mold can be used interchangeably in either of the above methods of making the hose.

Variations and modifications may be made within the scope of the claims and portions of the improvements may be used without others.

1. A molded, elongate, reenforced hose member adapted to be severed intermediate the ends and between the reenforcement thereof into a plurality of short hose sections, said hose member comprising an elongate body of elastomeric material having a smooth, cylindrical, molded outer surface and having at least at intervals therein spaced annular reenforcements embedded in the body and forming spaced corrugations projecting into the bore of the hose, said annular reenforcements each comprising a coil of resilient wire with the ends overlapped and secured together only by said elastomeric material surrounding the same, whereby the reenforcements have limited expansion and contraction as controlled by said elastomeric material and provide continuous radial circumferential reenforcement despite said expansion and contraction.

2. The invention as defined in claim 1 wherein said body of elastomeric material is provided with an outer layer of fabric reenforcement surrounding the same and secured thereto.

3. A molded, elongate, reenforced hose member adapted to be severed intermediate the ends and between the annular reenforcement thereof into a plurality of short hose sections, said hose member comprising an elongate body of elastomeric material having a smooth, cylindrical, molded outer surface and having short helical reenforcements connected by spaced annular reenforcements embedded in the body and forming spaced corrugations projecting into the bore of the hose, said annular reenforcements each comprising a coil of resilient wire with the ends overlapped and secured together only by said elastomeric material surrounding the same, whereby the annular reenforcements have limited expansion and contraction as controlled by said elastomeric material and provide continuous radial circumferential reenforcement despite said expansion and contraction.

4. The method of forming a reenforced hose comprising the steps of applying a layer of moldable elastomeric material on an expansible tubular mandrel, positioning wire reenforcements on the layer in predetermined spaced relation, slightly expanding the layer to cause the layer to engage and hold the reenforcements in place on the layer, wrapping an outer cover layer over the expanded layer and reenforcements thereon and adhering the same to the reenforcement and the layer between the reenforcements to anchor the reenforcement in place on the body, inserting the assembly into a cylindrical mold cavity, and applying fluid pressure to the interior of the hose to press the outer layer outwardly into firm engagement with the walls of the mold and the inner layer around and between the reenforcements to form a reenforced hose having a smooth, cylindrical, molded outer surface and a corrugated inner surface, and setting the hose in molded relation.

5. The method of forming a reenforced hose comprising the steps of applying a layer of moldable elastomeric material on an expansible tubular mandrel, positioning a plurality of separate annular wire reenforcements on the layer in predetermined spaced relation, the ends of the annular reenforcements being in overlapped and unconnected relation, slightly expanding the mandrel to cause the layer to engage and hold the reenforcements in place on the layer, wrapping an outer cover layer over the expanded layer and reenforcements thereon and adhering the same to the reenforcements and the layer between the reenforcements to anchor the reenforcements in place on the body, removing the assembly from the mandrel and inserting it into a cylindrical mold cavity, applying fluid pressure to the interior of the hose to press the layer outwardly to embed the reenforcement therein and secure the overlapped ends thereof together for limited relative movement and into firm engagement with the outer layer, and the outer layer into engagement with the walls of the cylindrical mold cavity to form a hose having a smooth, molded, cylindrical outer surface and a corrugated inner surface, and setting the hose in molded form.

6. The method of forming a reenforced hose adapted to be severed into short lengths comprising the steps of applying a layer of moldable elastomeric material on an expansible tubular mandrel, positioning a plurality of short helical wire reenforcements on the layer in predetermined spaced relation with a plurality of spaced annular reenforcements therebetween, the ends of the annular reenforcements being in overlapped and unconnected relation, slightly expanding the mandrel to cause the layer to engage and hold the reenforcements in place on the layer, wrapping an outer cover layer over the expanded layer and reenforcements thereon and adhering the same to the reenforcements and the layer between the reenforcements to anchor the reenforcements in place on the body, removing the assembly from the mandrel and inserting it into a cylindrical mold cavity, and applying fluid pressure to the interior of the hose to press the layer outwardly to embed the reenforcement therein and secure the overlapped ends thereof together for limited relative movement and into firm engagement with the outer layer, and the outer layer into engagement with the walls of the cylindrical mold cavity to form a hose having a smooth, molded, cylindrical outer surface and a corrugated inner surface and adapted to be severed between the annular corrugations into hose sections of shorter length, and setting the hose in molded form.

7. The method of forming a reenforced hose comprising the steps of applying a body forming layer of moldable elastomeric material on an expansible tubular mandrel, positioning wire reenforcements on the layer in predetermined spaced relation, securing the reenforcements in place on the outer surface of the layer, inserting the assembly into a cylindrical mold cavity, and applying fluid pressure to the interior of the hose to press the body outwardly between and around said reenforcements and into firm engagement with the walls of the mold to embed the reenforcements in the body and cause them to project from the inner surface of the body to form a reenforced hose having a smooth, cylindrical, molded outer surface and a corrugated inner surface, and setting the hose in molded form.

8. The method of forming a reenforced hose comprising the steps of applying a hose body in the form of a layer of moldable elastomeric material on a tubular mandrel having air passages therein, positioning wire reenforcements on the layer in predetermined spaced relation, applying fluid pressure to the passages in the mandrel and slightly expanding the body to hold the reenforcements in place thereon, securing the reenforcements to the outer surface of the layer, inserting the assembled body and reenforcements into a cylindrical mold cavity, and applying fluid pressure to the interior of the hose to press the body outwardly between and around said reenforcements and into firm engagement with the walls of the mold to embed the reenforcements in the body and cause them to project from the inner surface of the body to form a reenforced hose having a smooth, cylindrical, molded outer surface and a corrugated inner surface, and setting the hose in molded form.

9. The method of forming a reenforced hose comprising the steps of forming a body by applying a layer of moldable elastomeric material to extend over a tubular mandrel having passages therein terminating in the surface thereof, securing the ends of the body in fluid-tight relation with the mandrel, positioning annular wire reenforcements on the body in predetermined spaced relation, slightly expanding the body to engage and hold the reenforcements in place thereon, wrapping an outer cover layer of the cord fabric over the expanded layer and reenforcements thereon, inserting the mandrel and assembled hose into a cylindrical, smooth walled mold cavity, applying fluid pressure to the interior of the body to press the cover layer outwardly into firm engagement with the walls of the mold and the body layer into engagement with the outer layer and between the reenforcement to form a hose having a smooth, molded outer cylindrical surface and a corrugated inner surface, and setting the hose in molded form.

10. The method of forming a reenforced hose comprising the steps of forming a body by applying a layer of moldable elastomeric material to extend over a tubular mandrel having passages therein terminating in the surface thereof, securing the ends of the body in fluid-tight relation with the mandrel, positioning annular wire reenforcements on the body in predetermined spaced relation, slightly expanding the body to engage and hold the reenforcements in place thereon to project outwardly therefrom, applying an outer cover layer over the expanded layer and reenforcements thereon and adhering the same to the reenforcement and the layer between the reenforcements to anchor the reenforcement in place on the body, inserting the mandrel and assembled hose in a cylindrical, smooth walled mold cavity, applying fluid pressure to the interior of the layer to press the cover layer outwardly into firm engagement with the cylindrical wall of the mold cavity and the body layer into engagement with the outer layer and between the reenforcement to cause the reenforcements to project inwardly from the body and form a hose having a smooth, molded outer cylindrical surface and a corrugated inner surface, and setting the hose in molded form.

References Cited in the file of this patent

UNITED STATES PATENTS

| 132,006 | Harris | Oct. 8, 1872 |
| 2,393,496 | Stedman | Jan. 22, 1946 |
| 2,396,059 | Roberts | Mar. 5, 1946 |

FOREIGN PATENTS

| 792,388 | France | Dec. 30, 1935 |